Patented Feb. 28, 1939

2,149,051

UNITED STATES PATENT OFFICE 2,149,051

WATER-INSOLUBLE AZO DYESTUFFS

Johann Heinrich Helberger, Cologne-Mulheim, and Carl Taube, Leverkusen-I. G.-Werk, Germany, assignors to General Aniline Works, Inc., New York, N. Y., a corporation of Delaware No Drawing. Application April 27, 1935, Serial No. 18,688. In Germany May 15, 1934

4 Claims. (Cl. 260—158)

The present invention relates to new water-insoluble azo-dyestuffs, more particularly it relates to dyestuffs which may be represented by the probable general formula:

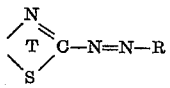

wherein

stands for the radical of a diazotized 2-aminothiazole and R stands for the radical of a coupling component which has been coupled in p-position to an amino group, such coupling components in which the amino-nitrogen atom is member of a ring being included.

Our new azodyestuffs are obtainable by diazotizing a 2-aminothiazole compound and coupling with an amine coupling in p-position to the amino group.

Our new dyestuffs thus obtainable are suitable for dyeing cellulose esters, such as cellulose acetate silk; they generally yield clear yellowish to red to blue to green shades of good dischargeability. Those of our dystuffs containing a primary amino group can be diazotized on the fibre and further developed.

The invention is illustrated by the following examples, without being limited thereto:

*Example 1.*—18 parts by weight of 6-methoxy-2-aminobenzothiazole are dissolved in a warm mixture of 50 parts by weight of water and 15 parts by weight of formic acid, the solution is cooled and introduced into a cold mixture of 50 parts by weight of water and 110 parts by weight of concentrated sulfuric acid. The sulfate of the 6-methoxy-2-aminobenzothiazole formed separates as a thick paste. Then 6.9 parts by weight of sodium nitrite are dissolved in 25 parts by weight of water and dropped in at —10 to —5° C., while stirring. When nitrous acid can no longer be detected, the mass is diluted with ice and 19.5 parts by weight of dihydroxyethyl-m-toluidine, dissolved in 50 parts by weight of water with the aid of sulfuric acid, are stirred in while cooling. When the coupling is complete, the dyestuff sulfate formed is filtered with suction, then is suspended in water, rendered alkaline with sodium carbonate, filtered with suction and dried. The dyestuff having in the free state the following formula:

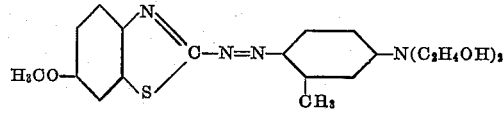

dyes cellulose acetate artificial silk from a soap bath clear pink shades which can be discharged.

*Example 2.*—18 parts by weight of 6-methoxy-2-aminobenzothiazole are dissolved in a warm mixture of 55 parts by weight of water and 15 parts by weight of formic acid, the solution is cooled and introduced into a cold mixture of 50 parts by weight of water and 110 parts by weight of concentrated sulfuric acid. 6.9 parts by weight of sodium nitrite are dissolved in 25 parts by weight of water and dropped in at —10 to —5° C. while stirring. When nitrous acid can no longer be detected, the mass is diluted with ice and 18.3 parts by weight of dihydroxyethylaniline dissolved in 50 parts by weight of water with the aid of sulfuric acid are stirred in while cooling. When the coupling is complete, the dyestuff is filtered with suction, suspended in water, rendered alkaline with sodium carbonate, filtered with suction and dried. In the free state it corresponds to the following formula:

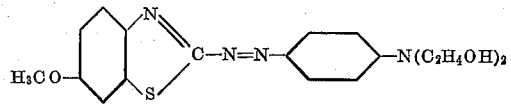

and dyes cellulose acetate artificial silk from a soap bath clear red shades which can be discharged.

Dyestuffs possessing similar properties are obtained by substituting the dihydroxyethylaniline by methylhydroxyethylaniline, ethylhydroxyethylaniline, diethylaniline, dimethylaniline, 1-methyl-3-aminobenzene, 1 - methyl-2-amino-4-methoxybenzene, 1,4-dimethyl-2-aminobenzene, 1-methyl-3-dihydroxy-ethylamino - 4 - methoxy - benzene, dihydroxyethyl-m-chloroaniline or dihydroxyethylamino - hydroquinonedimethylether, and the 6-methoxy-2-aminobenzothiazole by the 6-ethoxy-, the 6-chloro-, the 6-methyl-, the 4-chloro-6-methyl- or the 6-nitro-2-aminobenzothiazole.

*Example 3.*—11.4 parts by weight of 4-methyl-2-aminothiazole are dissolved in 150 parts by weight of concentrated sulfuric acid and carefully diazotized at —5° C. with the calculated quantity of nitrosyl sulfuric acid. The diazo solution thus obtained is stirred into a solution of 18.3 parts by weight of dihydroxyethylaniline in 1000 parts by weight of ice water and a little sulfuric acid. The dyestuff formed is isolated, washed and dried. After recrystallization from a large quantity of boiling water it is obtained in the form of well defined needles or prisms. In the free state the dyestuff corresponds to the following formula:

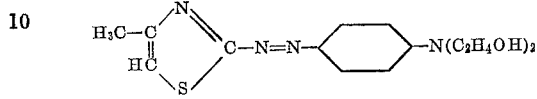

it dyes cellulose artificial acetate silk from the soap bath yellowish-red shades.

*Example 4.*—20.4 parts by weight of the 2-aminothiazole from tetrahydro-β-naphthylamine are dissolved in 150 parts by weight of formic acid, while cooling, and diazotized while stirring and cooling with a freezing mixture with 6.9 parts by weight of sodium nitrite dissolved in 30 parts by weight of water. While continuously cooling, there is dropped in a solution of 15.5 parts by weight of methylhydroxyethylaniline in 30 parts by weight of glacial acetic acid. When the coupling is complete, the mixture is diluted with a large quantity of water and the dyestuff having in the free state the following formula:

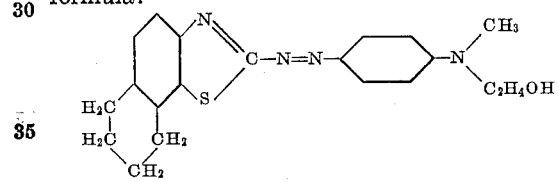

is filtered and dried. It dyes cellulose acetate silk from a soap bath bluish-red shades.

*Example 5.*—22 parts by weight of 2-aminobenzothiazole are dissolved in a mixture of 60 parts by weight of formic acid, 20 parts by weight of glacial acetic acid and 45 parts by weight of concentrated hydrochloric acid. At −10 to −5° C. there is slowly dropped in an aqueous sodium nitrite solution of 50% strength in a quantity sufficient for the complete diazotization. (About 10 parts by weight of NaNO₂.) When the diazotization is complete, a solution of 20 parts by weight of 1-amino-3-methyl-6-methoxybenzene in 50 parts by weight of glacial acetic acid is introduced. The coupling takes place immediately and after stirring for a short time the hydrochloride of the dyestuff formed crystallizes. The dyestuff having in the free state the following formula:

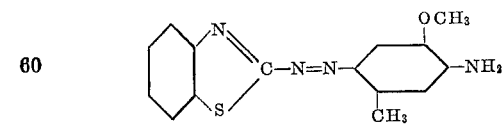

dyes cellulose acetate artificial silk from a soap bath scarlet red shades. Diazotized on the fibre and developed with 2,3-hydroxynaphthoic acid it yields a blue of good dischargeability.

*Example 6.*—10 parts by weight of 6-methoxy-2-aminobenzothiazole are diazotized with 6.9 parts by weight of sodium nitrite, as described in Example 1. The strongly sulfuric acid diazo solution is introduced into a solution of 23.5 grams of py-tetrahydro-3-hydroxynapthopyridinechlorohydrate dissolved in 50 parts by weight of water, while stirring. The coupling immediately enters, and after stirring for some time the free mineral acid is neutralized with the aid of aqueous soda lye, sucked off and washed with water. When dyed in the usual manner on cellulose acetate silk, reddish-blue shades of very good dischargeability are obtained. The dyestuff corresponds in the free state to the following formula:

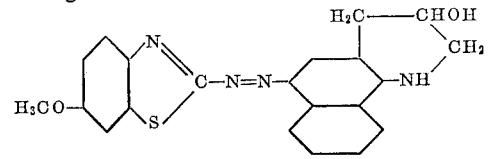

*Example 7.*—15 parts by weight of 2-aminobenzothiazole are coupled in the usual manner with 15.9 parts by weight of 1,5-aminonaphthol in a mineral acid solution. The working up is performed as described in Example 6. The dyestuff thus obtained having in the free state the following formula:

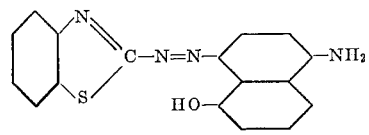

dyes cellulose acetate silk powerful blue shades which can be discharged to a pure white.

When substituting the 2-aminobenzothiazole by a substitution product of the same, such as the 6-methoxy-, or -ethoxy- or -methyl- derivative, dyestuffs exerting similar properties are obtained.

*Example 8.*—18 parts by weight of 6-methoxy-2-aminobenzothiazole are dissolved in a warm mixture of 50 parts by weight of water and 15 parts by weight of formic acid, the solution is cooled and introduced into a cold mixture of 50 parts by weight of water and 110 parts by weight of concentrated sulfuric acid. The sulfate of the 6-methoxy-2-aminobenzothiazole formed separates. Then 6.9 parts by weight of sodium nitrite are dissolved in 25 parts by weight of water and dropped in at −10 to −5° C. When sodium nitrite can no longer be detected, the mass is diluted with ice and the sulfuric acid diazo solution is introduced into a hydrochloric acid solution of 21.5 parts by weight of py-3-hydroxytetrahydro-7-hydroxynapthopyridine in about 600 parts by weight of water containing ice. The coupling takes place almost immediately, and after a short time the dyestuff formed has precipitated completely. After neutralizing the free mineral acid with the aid of sodium acetate or caustic soda, the dyestuff is isolated by pressing. In the free state it corresponds to the following formula:

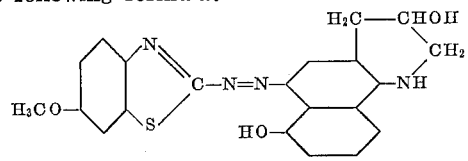

and dyes cellulose acetate silk from a soap bath clear bluish-green shades of good dischargeability.

By substituting the 6-methoxy-2-aminobenzothiazole by the 6-ethoxy-2-aminobenzothiazole or the 2-aminobenzothiazole there is obtained a dyestuff possessing similar properties.

*Example 9.*—18 parts by weight of 6-methoxy-2-aminobenzothiazole are diazotized in aqueous sulfuric acid solution of 50% strength with 6.9 parts by weight of sodium nitrite below 0° C. The orange diazo solution is introduced into a mineral acid aqueous solution of 23.5 parts by weight of py-tetrahydro-7-hydroxynaphthopyridine-hydrochloride. The coupling is complete after a short time. The dyestuff is isolated in the usual manner; it dyes cellulose acetate silk bluish-green shades of good fastness to light and good dischargeability. In the free state it corresponds to the following formula:

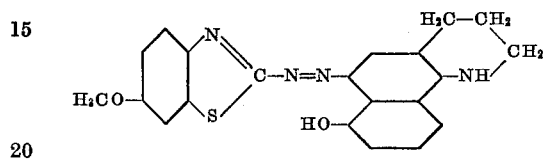

*Example 10.*—18 parts by weight of 6-methoxy-2-aminobenzothiazole are diazotized, as described in Example 1, with 6.9 parts by weight of sodium nitrite in aqueous sulfuric acid of 50–60% strength at −5° C. The diazo solution is introduced into a sulfuric acid solution of 16.2 parts by weight of N-phenylpiperazine. When the coupling is complete, the dyestuff is isolated in the usual manner; in the free state it corresponds to the following formula:

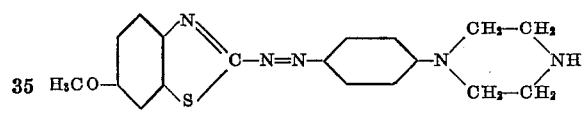

and dyes cellulose acetate silk clear red shades of good dischargeability.

*Example 11.*—18 parts by weight of 6-methoxy-2-aminobenzothiazole are diazotized, as described in Example 1, with 6.9 parts by weight of sodium nitrite in aqueous sulfuric acid solution of 50–60% strength at −5° C. The diazo solution is introduced into a sulfuric acid solution of 22 parts by weight of py-tetrahydro-1-butyl-3-hydroxy-7-methylquinoline of the formula:

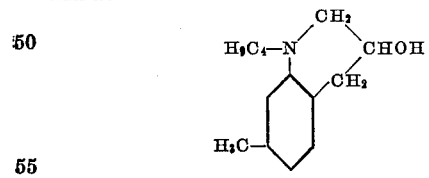

When the formation of the dyestuff is complete, the free mineral acid is neutralized to a far-reaching extent, whereby the dyestuff separates in the form of a resin. By pasting with suitable dispersing agents it is brought into a form suitable for dyeing purposes. On cellulose acetate silk the dyestuff yields clear, reddish-violet shades which can be discharged to a pure white. In the free state it corresponds to the following formula:

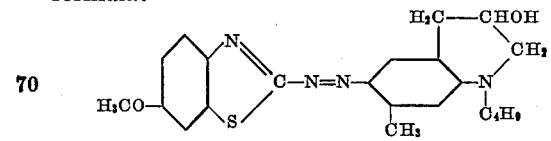

*Example 12.*—18 parts by weight of 6-methoxy-2-aminobenzothiazole are diazotized as described in Example 1. The diazo solution obtained is then dropped into a solution of 20.3 parts by weight of 1-hydroxyethylamino-5-hydroxynaphthalene in aqueous diluted hydrochloric acid. When the coupling is complete, the reaction mixture is rendered weakly alkaline and the dyestuff of the formula:

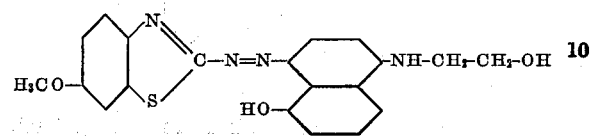

is filtered with suction. It yields on acetate silk clear blue shades of good dischargeability.

Dyestuffs exerting similar properties are obtained when substituting the diazotization component by 2-aminobenzothiazole or substitution products thereof other than the 6-methoxy derivative, or by substituting the 1-hydroxyethylamino-5-hydroxynaphthalene by 1-(γ-chloro-2-hydroxypropyl)amino-5-hydroxynaphthalene, or the 1-dimethylamino-5-hydroxynaphthalene.

*Example 13.*—18 parts by weight of 6-methoxy-2-aminobenzothiazole are diazotized as described in Example 1. The diazo solution is dropped into a solution of 29.4 parts by weight of py-tetrahydro-1-hydroxyethyl-3.7-dihydroxynaphthopyridine-chlorohydrate in dilute aqueous hydrochloric acid. The dyestuff is isolated in the usual manner. It yields on cellulose acetate silk bluish-green shades of good dischargeability. The dyestuff corresponds to the following formula:

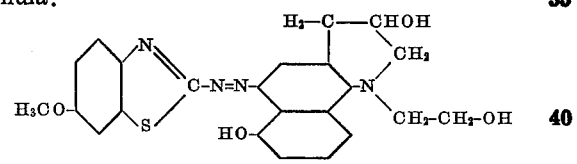

Dyestuffs exerting similar properties are obtained when substituting the 6-methoxy-2-aminobenzothiazole by the 6-methyl-2-aminobenzothiazole or by the unsubstituted 2-aminobenzothiazole.

We claim:

1. Waterinsoluble azodyestuffs for the dyeing of cellulose esters of the following formula:

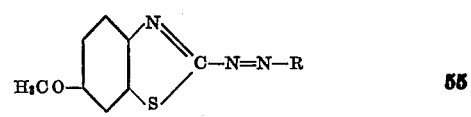

wherein R stands for the radical of a coupling component selected from the group consisting of N-di-(hydroxyalkyl) substitution products of benzene and its homologues and hydroxy-substitution products of py-tetrahydro-naphthopyridine, said dyestuffs being free from water solubilizing groups and yielding on cellulose esters clear shades of good dischargeability.

2. The waterinsoluble azodyestuff for the dyeing of cellulose esters of the following formula:

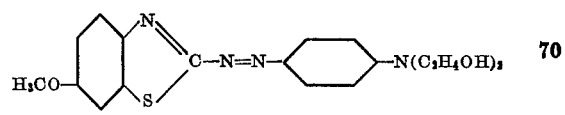

dyeing cellulose acetate silk from a soap bath clear red shades of good dischargeability.

3. The waterinsoluble azodyestuff for the dyeing of cellulose esters of the following formula:

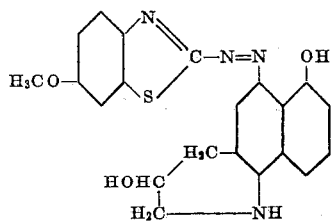

dyeing cellulose acetate silk from a soap bath clear bluish-green shades of good dischargeability.

4. The waterinsoluble azodyestuff for the dyeing of cellulose esters of the following formula:

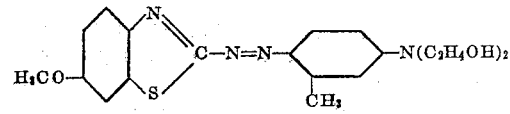

dyeing cellulose acetate silk from a soap bath clear pink shades of good dischargeability.

JOHANN HEINRICH HELBERGER.
CARL TAUBE.